(12) United States Patent
Van Rens et al.

(10) Patent No.: US 12,546,731 B1
(45) Date of Patent: Feb. 10, 2026

(54) INSPECTION TOOL, INSPECTION TOOL OPERATING METHOD, AND NON-TRANSITORY COMPUTER READABLE MEDIUM

(71) Applicant: ASML Netherlands B.V., Veldhoven (NL)

(72) Inventors: Jasper Frans Mathijs Van Rens, Hegelsom (NL); Albertus Victor Gerardus Mangnus, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 562 days.

(21) Appl. No.: 17/970,452

(22) Filed: Oct. 20, 2022

Related U.S. Application Data

(63) Continuation of application No. PCT/EP2021/059714, filed on Apr. 14, 2021.

(30) Foreign Application Priority Data

Apr. 20, 2020 (EP) ..................................... 20170478
Feb. 24, 2021 (EP) ..................................... 21159062

(51) Int. Cl.
*H01J 37/147* (2006.01)
*G01N 23/20008* (2018.01)
(Continued)

(52) U.S. Cl.
CPC ... *G01N 23/2206* (2013.01); *G01N 23/20008* (2013.01); *G01N 23/203* (2013.01);
(Continued)

(58) Field of Classification Search
None
See application file for complete search history.

(56) References Cited

U.S. PATENT DOCUMENTS 10,319,556 B2  6/2019  Jing et al.
2008/0285602 A1  11/2008  Nagai et al.
(Continued)

FOREIGN PATENT DOCUMENTS

CN  108122725 A  6/2018
EP  2 722 865 A1  4/2014
(Continued)

OTHER PUBLICATIONS

Van Rens et al., Dual mode microwave deflection cavities for ultrafast electron microscopy (Jan. 28, 2019), Applied Physics Letters, Oct. 2018 (Year: 2019).*
(Continued)

*Primary Examiner* — James Choi
(74) *Attorney, Agent, or Firm* — FINNEGAN, HENDERSON, FARABOW, GARRETT & DUNNER LLP

(57) ABSTRACT

The present disclosure relates to an inspection tool having a charged particle source to provide a charged particle beam, a sample holder to hold a sample, and a scanning system configured to scan the charged particle beam over an area of the sample in a scanning pattern. The scanning system may comprise a microwave or RF wave supporting structure to provide a first oscillating electromagnetic field to periodically deflect the charged particle beam in order to scan the charged particle beam over the area of the sample. The charged particle beam may be an electron beam, so that the inspection tool may be a scanning electron microscope. The scanning system may be configured to continuously scan the charged particle beam over the area of the sample.

19 Claims, 4 Drawing Sheets

(51) Int. Cl.
*G01N 23/203* (2006.01)
*G01N 23/2206* (2018.01)
*G01N 23/2251* (2018.01)
*H01J 37/28* (2006.01)

(52) U.S. Cl.
CPC ...... *G01N 23/2251* (2013.01); *H01J 37/1474* (2013.01); *H01J 37/28* (2013.01); *G01N 2223/045* (2013.01); *G01N 2223/053* (2013.01); *G01N 2223/07* (2013.01); *G01N 2223/30* (2013.01); *G01N 2223/418* (2013.01); *G01N 2223/507* (2013.01)

(56) References Cited

U.S. PATENT DOCUMENTS

| | | | |
|---|---|---|---|
| 2014/0103225 A1* | 4/2014 | Kieft | H01J 37/045 250/440.11 |
| 2017/0063021 A1 | 3/2017 | Bae et al. | |
| 2017/0162361 A1 | 6/2017 | Jing et al. | |
| 2017/0243713 A1* | 8/2017 | Kieft | H01J 37/20 |
| 2018/0107017 A1 | 4/2018 | Mason | |
| 2020/0161082 A1* | 5/2020 | Inoue | H01J 37/222 |

FOREIGN PATENT DOCUMENTS

| | | |
|---|---|---|
| EP | 3 133 633 A1 | 2/2017 |
| EP | 3 340 273 A1 | 6/2018 |
| JP | 2017152366 A | 8/2017 |
| JP | 2018088402 A | 6/2018 |
| TW | 201129795 A1 | 9/2011 |
| TW | 201933411 | 8/2019 |
| WO | WO 2020/136044 A2 | 7/2020 |

OTHER PUBLICATIONS

International Search Repot issued in related Foreign Application No. PCT/EP2021/059714; mailed Jul. 9, 2021 (3 pgs.).

European Search Report issued in related European Patent Application No. 20170478; mailed Sep. 28, 2020 (2 pgs.).

Office Action of the Intellectual Property Office of Taiwan issued in related Taiwanese Patent Application No. 110113954; mailed Feb. 11, 2022 (12 pgs.).

Van Rens, J. F. M. (2019). "Ultrafast transmission electron microscopy using resonant microwave deflection cavities", [Phd Thesis 1 (Research TU/e / Graduation TU/e), Applied Physics], Published Sep. 19, 2019, Technische Universiteit Eindhoven. (available at https://research.tue.nl/nl/publications/ultrafast-transmission-electron-microscopy-using-resonant-microwa ).

Qiu, Jiaqi et al., "GHz Laser-free Time-resolved Transmission Electron Microscopy: a Stroboscopic High-duty-cycle Method".

Van Rens J F M et al: "Dual mode microwave deflection cavities for ultrafast electron microscopy", arxiv.org, Cornell University Library, 201 Olin Library Cornell University Ithaca, NY 14853, Jan. 28, 2019.

* cited by examiner

INSPECTION TOOL, INSPECTION TOOL OPERATING METHOD, AND NON-TRANSITORY COMPUTER READABLE MEDIUM

CROSS-REFERENCE TO RELATED APPLICATIONS

This application claims priority to International Application No. PCT/EP2021/059714, filed on Apr. 14, 2021, and published as WO 2021/213870 A1, which claims priority of EP Application Serial No. 20170478.0 which was filed on Apr. 20, 2020, and EP Application Serial No. 21159062.5 which was filed on Feb. 24, 2021, all of which are incorporated herein by reference in their entireties.

FIELD

The present disclosure relates to an inspection tool, and more particularly an inspection tool with an enhanced scan rate in excess of 1 GHz. The present disclosure further relates to a method for operating an inspection tool and a non-transitory computer readable medium storing a set of instructions that is executable by one or more processors of an inspection tool.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed.

Scanning a generated electron beam over a sample is typically carried out by electric or magnetic deflectors using plates or coils, respectively. The scan rate is generally in the MHz range.

SUMMARY

In one aspect, the present disclosure is directed to an inspection tool having a charged particle source to provide a charged particle beam, a sample holder to hold a sample, and a scanning system configured to scan the charged particle beam over an area of the sample in a scanning pattern. The scanning system may comprise a microwave or RF (radio Frequency) wave supporting structure, like a cavity or a stripline, to provide a first oscillating electromagnetic field to periodically deflect the charged particle beam in order to scan the charged particle beam over the area of the sample. The charged particle beam may be an electron beam, so that the inspection tool may be a scanning electron microscope. The scanning system may be configured to continuously scan the charged particle beam over the area of the sample.

Microwave cavities are an example of microwave or RF wave supporting structures and described in more detail in Verhoeven, W. (2018), *Ultrafast electron microscopy and spectroscopy using microwave cavities*, Eindhoven: Technische Universiteit Eindhoven, and Van Rens, J. F. M. (2019), *Ultrafast transmission electron microscopy using resonant microwave deflection cavities*, Eindhoven: Technisch Universiteit Eindhoven, both publications being incorporated herein by reference. Striplines, like traveling-wave striplines are other examples of microwave or RF wave supporting structures and described in more detail in Lau, June W., et al., *Laser-free GHz stroboscopic transmission electron microscope: Components, system integration, and practical considerations for pump-probe measurements*, Review of Scientific Instruments 91.2 (2020): 021301, and also incorporated herein by reference.

Scanning may be carried out in a single direction so that a single-mode microwave or RF wave supporting structure, like a cavity or stripline, may be used. The scanning system may be configured to provide a second oscillating electromagnetic field different from the first oscillating electromagnetic field to periodically deflect the charged particle beam in order to scan the charged particle beam over the area of the sample. The second oscillating electromagnetic field may be provided by the same microwave or RF wave supporting structure configured to provide the first oscillating electromagnetic field. The microwave or RF wave supporting structure may then be a dual-mode microwave or RF wave supporting structure. The second oscillating electromagnetic field may alternatively be provided by another microwave or RF wave supporting structure, which may be a single-mode microwave or RF wave supporting structure. The microwave or RF wave supporting structure configured to provide the first oscillating electromagnetic field may then be referred to as the first microwave or RF wave supporting structure, and the microwave or RF wave supporting structure configured to provide the second oscillating electromagnetic field may then be referred to as the second microwave or RF wave supporting structure.

Having two oscillating electromagnetic fields enables to scan over an area of the sample with a 2D scanning pattern. Preferably, the scanning system is configured to provide the first oscillating electromagnetic field perpendicular to the second oscillating electromagnetic field. Hence, the first and second oscillating electromagnetic fields are configured to periodically deflect the charged particle beam in different directions. However, it is also envisaged that the second oscillating electromagnetic field is configured to periodically deflect the charged particle beam in the same direction, for instance opposite to the first oscillating electromagnetic field enabling to direct the charged particle beam through a specific point in space while allowing a scanning pattern to be generated.

When the scanning system is configured such that the first and second oscillating electromagnetic fields are configured to periodically deflect the charged particle beam in different directions, the scanning system may further be configured to operate the first oscillating electromagnetic field at a different frequency than the second oscillating electromagnetic field. When the two oscillating electromagnetic fields are not phase-locked, for instance because the microwave or RF wave input signals to the respective microwave or RF wave supporting structures are not phase-locked, the charged particle beam will eventually cover the entire to be scanned area of the sample. In some embodiments, the scanning system is configured to operate the first oscillating electromagnetic field and the second oscillating electromagnetic field such that the first and second oscillating electromagnetic field are phase-locked, for instance by phase-locking the microwave or RF wave input signals. This enables to create a Lissajous pattern as scanning pattern. The Lissajous pattern may be repeated to allow averaging techniques to improve accuracy of the measurement. A ratio between the two different frequencies may be rational so that a closed Lissajous pattern is formed that can easily be repeated.

In some embodiments, the inspection tool further comprises a detector system to detect back-scattered or secondary charged particles from the sample. The detector system may comprise an imaging system to image the back-scattered or secondary charged particles from the sample directly on a detector, e.g., a pixelated detector.

The detector system may be configured to periodically deflect the charged particles from the sample on a detector, e.g., a pixelated charged particle camera, for instance using plates or coils. The detector system may comprise a microwave or RF wave supporting structure configured to provide an oscillating electromagnetic field similar to the first oscillating electromagnetic field to periodically deflect the charged particles from the sample on a detector, e.g., a pixelated charged particle camera. This enables to spatially resolve the different arrival times of the charged particles originating from different positions on the sample. The detector system may further comprise a lens system to focus the back-scattered or secondary charged particles from the sample before or after being deflected by the microwave or RF wave supporting structure.

The detector system may be configured to deflect the back-scattered or secondary charged particles from the sample in a deflection pattern similar to the scanning pattern on a detector. This may for instance be carried out by providing identical or at least similar microwave or RF wave supporting structures for creating the deflection pattern as used for creating the scanning pattern. The detector system and the scanning system may be configured such that the deflection pattern of the detector system and the scanning pattern are phase-locked, for instance by using microwave or RF wave input signals that are phase-locked, e.g., by originating from the same microwave or RF wave source. The deflection pattern and scanning pattern may also differ, e.g., in scan rate. The scan rate of the scanning pattern may for instance be a plurality of the scan rate of the deflection pattern. The electromagnetic field amplitude of the microwave or RF wave supporting structure in the detection system may also differ (e.g., be significantly larger) from the electromagnetic field amplitude of the microwave or RF wave supporting structure in the scanning system used for scanning the charged particle beam over the sample, allowing larger sized pixels on a charged particle detector, e.g., a pixelated charged particle camera.

The detector system and the scanning system may be configured such that the deflection pattern of the detector system and the scanning pattern have a non-zero phase difference of e.g., 90 degrees. This enables to use a different relation between the deflection pattern and the scanning pattern allowing to improve temporal resolution of at least some portions of the scanning pattern.

The inspection tool may further comprise an objective lens arranged between the scanning system and the sample holder. The scanning system may include a counteracting microwave or RF wave supporting structure configured to deflect the charged particle beam from the microwave or RF wave supporting structure providing the first oscillating electromagnetic field towards an optical axis, preferably an origin of the objective lens. This enables to avoid or reduce off-axis aberrations during the scan. The counteracting microwave or RF wave supporting structure may use the same frequency as the first oscillating electromagnetic field. The counteracting microwave or RF wave supporting structure may use a phase or amplitude that is different from the phase or amplitude of the first oscillating electromagnetic field, respectively, e.g., to improve the counteracting deflection function.

The inspection tool may further comprise a beam separator, e.g., a Wien filter, to direct the charged particles from the sample towards the detector system. The beam separator may be arranged between the sample holder and the scanning system. Alternatively, the microwave or RF wave supporting structure may be arranged between the sample holder and the beam separator. In that case, another microwave or RF wave supporting structure may be arranged between the beam separator and the detector system to counteract the periodic deflection imposed on the back-scattered or secondary charged particles from the sample by the microwave or RF wave supporting structure arranged between the sample holder and the beam separator.

The scanning system may be configured to provide one or more oscillating electromagnetic fields that are higher-order harmonics of the first oscillating electromagnetic field to be combined with the first oscillating electromagnetic field to approximate a triangular-shaped (or any other non-sinusoidal) oscillating electromagnetic field or to improve the linearity of a portion of the initially sinusoidal wave form. Additionally, the scanning system may be configured to provide one or more oscillating electromagnetic fields that are higher-order harmonics of the second oscillating electromagnetic field to be combined with the second oscillating electromagnetic field to approximate a triangular-shaped (or any other non-sinusoidal) oscillating electromagnetic field. This can be used to increase the linearity of the Lissajous pattern.

Using higher-order harmonics may be used for creating the deflection pattern, in particular when the deflection pattern and the scanning pattern have the same scan rate and higher-order harmonics are also used for creating the scanning pattern.

In another aspect, the present disclosure is directed to a method of scanning a sample in an inspection tool. The method may include generating a charged particle beam and passing the charged particle beam through a microwave or RF wave supporting structure and towards a sample to scan the charged particle beam over an area of the sample in a scanning pattern. Scanning may be done continuously. The charged particle beam may be an electron beam.

The scanning pattern may be a 2D pattern, for instance to reach every spot within the sample area to be scanned or to create a Lissajous pattern.

The method may further comprise the step of capturing back-scattered or secondary charged particles from the sample and imaging said charged particles on a detector. A further microwave or RF wave supporting structure may be provided to deflect said back-scattered or secondary charged particles from the sample to form a deflection pattern on the detector. The deflection pattern may be similar or identical to the scanning pattern. The deflection pattern may for instance be created using higher-order harmonics as described above.

In a further aspect, the present disclosure is directed to a non-transitory computer readable medium storing a set of instructions that is executable by one or more processors of an inspection tool to cause the inspection tool to perform a method of inspecting a sample, the method comprising:
  a. activating a charged particle source to generate a charged particle beam;
  b. operating a microwave or RF wave supporting structure to scan the charged particle beam passing through the microwave or RF wave supporting structure and towards a sample over an area of the sample in a scanning pattern. The scanning pattern may be a 2D pattern, e.g. a Lissajous pattern.

The set of instructions that is executable by one or more processors of an inspection tool may cause the inspection tool to further perform deflecting back-scattered or secondary charged particles from the sample to form a deflection pattern on the detector. The deflection pattern may be similar to the scanning pattern.

In yet another aspect, the present disclosure is directed to an inspection tool comprising a charged particle source to generate charged particles, and a first microwave or RF wave deflection structure to direct charged particles from the charged particle source towards a sample. The first microwave or RF wave deflection structure may be a microwave or RF wave supporting structure as described above and the microwave or RF wave supporting structures described above may be a first microwave or RF wave deflection structure as described in this aspect. The first microwave or RF wave deflection structure may be configured to scan the sample at a scan rate in excess of 1 GHz. The charged particle source may be an electron source.

The inspection tool may further comprise a second microwave or RF wave deflection structure to direct secondary charged particles generated in response to the charged particles directed at the sample impacting the sample towards a detector. The second microwave or RF wave deflection structure may be a microwave or RF wave supporting structure as described above and the microwave or RF wave supporting structures described above may be a second microwave or RF wave deflection structure as described in this aspect. The first and second microwave or RF wave deflection structure may be configured to be operated in sync.

In yet another aspect, the present disclosure is directed to a method of scanning a sample in a SEM, the method comprising generating charged particles via a charged particle source and passing the charged particles through a first microwave or RF wave deflection structure and towards a sample. This preferably enables the sample to be scanned at a scan rate in excess of 1 GHz. The charged particle source may be an electron source.

The method may further comprise in response to the charged particles directed at the sample impacting the sample and causing secondary charged particles to be generated, passing the secondary charged particles through a second microwave or RF wave deflection structure that is synchronized with the first microwave or RF wave deflection structure to cause the secondary charged particles to be deflected towards a detector.

The method may further comprise scanning the sample in a Lissajous pattern at a scan rate in excess of 1 GHz. The Lissajous pattern may be imaged directly on the detector.

The first and second microwave or RF wave deflection structure may be synchronized with a predetermined non-zero phase difference of e.g., 90 degrees.

In a further aspect, the present disclosure is directed to a non-transitory computer readable medium storing a set of instructions that is executable by one or more processors of an inspection tool to cause the inspection tool to perform a method of inspecting a sample, the method comprising:
  a. activating a charged particle source to generate charged particles;
  b. operating a first microwave or RF wave deflection structure to scan a sample with the charged particles passing through the first microwave or RF wave deflection structure and towards the sample at a scan rate in excess of 1 GHz.

The set of instructions that is executable by one or more processors of an inspection tool may cause the inspection tool to further perform operating a second microwave or RF wave deflection structure in sync with the first microwave or RF wave deflection structure to cause secondary charged particles generated in response to charged particles being directed at the sample and impacting the sample to be deflected towards a detector.

Operating the first microwave or RF wave deflection structure may cause the sample to be scanned in a Lissajous pattern at a scan rate in excess of 1 GHz To avoid unduly repetition of embodiments and features, it is explicitly noted here that embodiments or features described in relation to one aspect may readily be combined with another aspect where appropriate.

BRIEF DESCRIPTION OF THE DRAWINGS

Embodiments of the present disclosure will now be described, by way of example only, with reference to the accompanying schematic drawings, in which.

DETAILED DESCRIPTION

Figure 1:
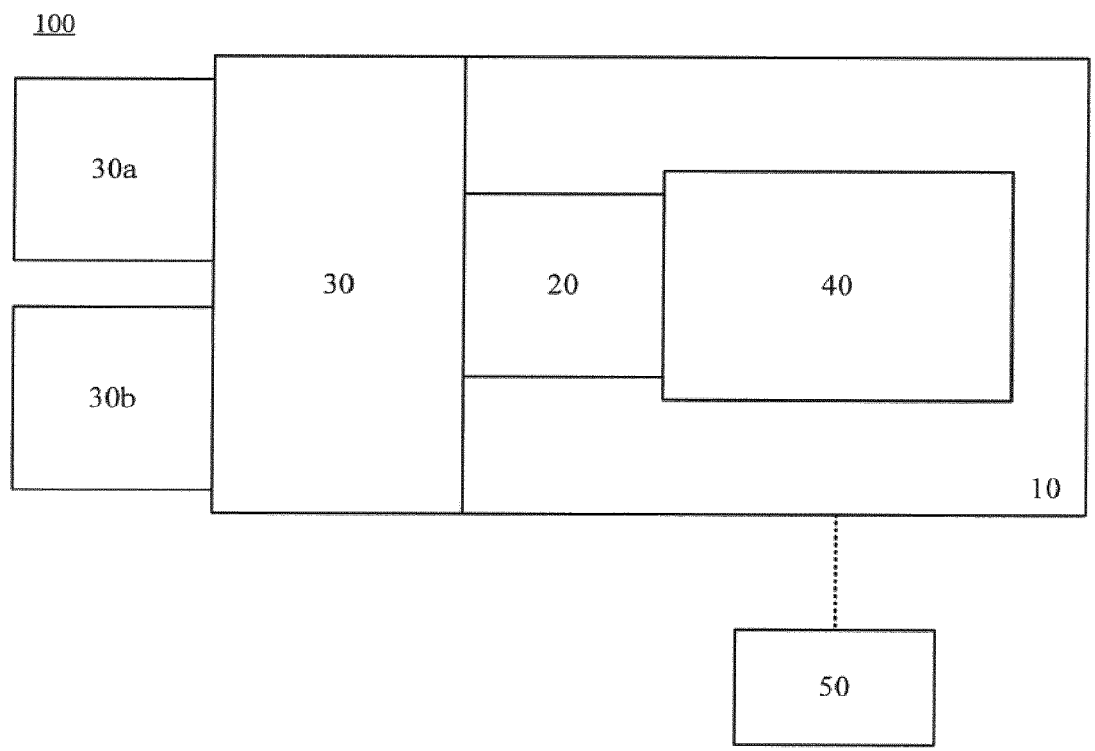
FIG. 1 depicts a schematic diagram illustrating an exemplary charged particle beam inspection system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented, and only the differences with respect to the individual embodiments are described. The implementations set forth in the following description of exemplary embodiments do not represent all implementations. Instead, they are merely examples of apparatuses and methods consistent with aspects related to the disclosed embodiments as recited in the appended claims.

Relative dimensions of components in drawings may be exaggerated for clarity. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The present disclosure is directed to an imaging apparatus for imaging very small features, typically in the nanometer range, which is about 1/10,000th to 1/1,000th of the thickness of a hair. When taking a picture with a photo camera, the camera captures light reflected or emitted by the different objects in the picture. Visible light is also suitable for optical microscopes, but due to its wavelengths in the range 400-700 nm, it is not suitable for imaging features smaller than these wavelengths, so that other radiation sources are used to image these features.

An imaging apparatus known as a scanning electron microscope uses electrons as a radiation source, which are negatively charged particles that are normally known as the particles flowing through electrical wiring e.g., to power our appliances at home. In a scanning electron microscope, a focused electron beam is scanned over the sample and as with the photo camera, electrons reflected or emitted by the sample are captured to form an image.

Hence, the sample is bombarded with electrons, pixel-by-pixel until each pixel of the image has received a predetermined amount of electrons. Due to the different nature of electrons compared to visible light, i.e., the electrons are particles having a mass and a negative charge, the electrons may cause the sample to locally shrink or be locally charged upon impact resulting in an image that is not representative for the original features anymore. The amount of shrinkage and charging is dependent on a maximum amount of electrons received by the sample per unit of time.

Some embodiments of the present disclosure relate to a scanning electron microscope that redistributes the amount of electrons received by the sample in time thereby lowering the maximum amount of electrons received by the sample per unit of time. The inventors considered to change the continuously supplied electron beam into a pulsed electron beam by alternatingly interrupting the beam. However, this is inefficient as it only uses a portion of the electrons while the others are wasted and thus it takes longer to obtain an image. The inventors also considered increasing the scan rate, but this turned out to be challenging for conventional scanning electron microscopes as these devices use plates to create electric fields or coils to create electromagnetic fields. It proved to be difficult to increase the scan rate due to the finite capacitance of the plates or the finite inductance of the coils. The present disclosure circumvents this challenge by abandoning the use of plates or coils to create oscillating electric or electromagnetic fields to move electrons in the electron beam, but instead in some embodiments uses one or more microwave or RF wave supporting structures in which microwave or RF waves form standing waves to create oscillating electromagnetic fields suitable to deflect the electron beam at frequencies allowing a faster scan rate. As a result thereof, the electron beam can be scanned faster over the sample, so that the number of electrons received by a pixel of the sample per unit of time is reduced. To obtain an image in which each pixel has received a predetermined amount of electrons, the scanning pattern can be repeated until the predetermined amount of electrons per pixel has been reached. In this way, the total charge and dose per pixel is not accumulated in a single and short dwell time (of e.g., 10 ns for 100 MHz scan speed), but instead incrementally accumulated during the total (millisecond to second) acquisition time of the entire image. As a result, the energy and charge have sufficient time to diffuse away through the sample throughout the measurement, resulting in reduced sample damage and reduced charging artefacts in the image. Another benefit may be that the time to scan the sample may be reduced thereby increasing throughput when e.g., the increased scan rate is combined with a higher electron beam current thereby accepting more shrinkage or charging effects, possibly as much shrinkage or charging effects as in prior art scanning electron microscopes to obtain maximum throughput for similar or equal image quality as in prior art scanning electron microscopes.

Reference is now made to FIG. 1, which illustrates an exemplary charged particle beam inspection (EBI) system 100 consistent with embodiments of the present disclosure. As shown in FIG. 1, charged particle beam inspection system 100 includes a main chamber 10, a load-lock chamber 20, an inspection tool 40, e.g., a scanning electron microscope, and an equipment front end module (EFEM) 30. Inspection tool 40 is located within main chamber 10.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by inspection tool 40. In some embodiments, inspection tool 40 may comprise a single-beam scanning electron microscope. In other embodiments, inspection tool 40 may comprise a multi-beam scanning electron microscope.

Controller 50 may be electronically connected to inspection tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an inspection tool 40, it should be noted that aspects of the disclosure in their broadest sense, are not limited to a chamber housing an inspection tool. Rather, it is appreciated that the foregoing principles may be applied to other chambers as well.

Figure 2:
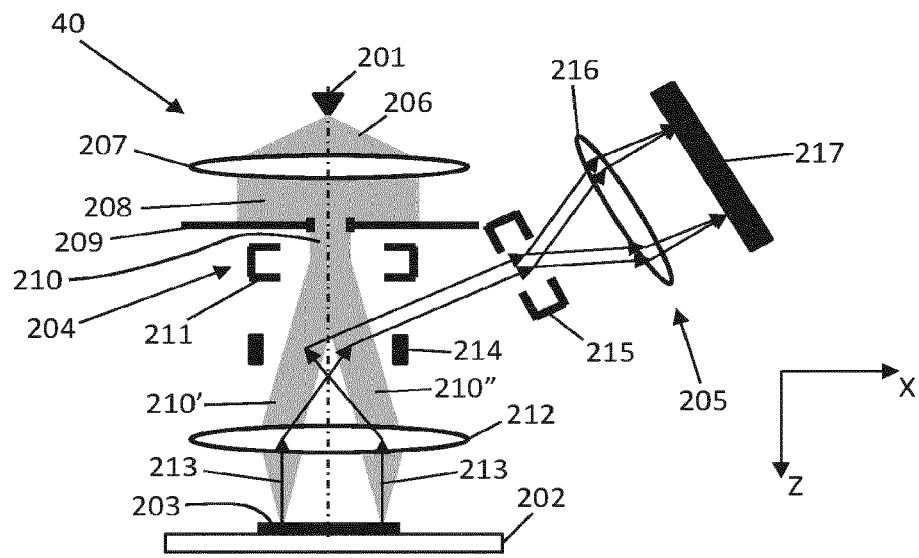
FIG. 2 schematically depicts an exemplary configuration of a scanning electron microscope that can be part of the exemplary electron beam inspection system of FIG. 1, consistent with embodiments of the present disclosure.

Reference is now made to FIG. 2, which illustrates an exemplary configuration of a scanning electron microscope 40 that can be part of the exemplary charged particle beam inspection system 100 of FIG. 1, consistent with embodiments of the present disclosure. Scanning electron microscope 40 (also referred to herein as SEM 40) may comprise an electron source 201, a sample holder 202 to hold a sample 203, e.g., a wafer, a scanning system 204 and a detection system 205. It may be appreciated that other commonly known components of SEM 40, such as, for example, a source conversion unit, a primary projection optical system or a secondary imaging system, may be added/omitted as appropriate or described as part of the electron source 201, the scanning system 204 or the detection system 205.

The electron source 201 is configured to provide electrons in the form of an electron beam 206. A condenser lens 207 may be arranged downstream of the electron source to shape the electron beam 206 and provide e.g. a parallel electron beam 208. An objective aperture 209 may be provided to form an electron beam 210 with a predetermined beam current.

The scanning system 204 includes a first microwave or RF wave supporting structure 211 configured to periodically deflect the electron beam 210 in X-direction. Two extreme positions of electron beam 210 in X-direction have been depicted and denoted reference symbols 210'and 210". The first microwave or RF wave supporting structure 211, which may alternatively be referred to as microwave or RF (Radio Frequency) cavity or microwave or RF wave deflection structure, is a resonator in which microwave or RF waves applied to the microwave or RF wave supporting structure bounce back and forth between walls of the microwave or RF wave supporting structure. At a resonance of the microwave or RF wave supporting structure, standing waves are formed resulting in a first oscillating electromagnetic field having the same frequency as the resonance of the microwave or RF wave supporting structure. By passing electrons through the first microwave or RF wave supporting structure 211, the electrons are subjected to the first oscillating electromagnetic field and periodically deflected while being directed to the sample 203, so that the electron beam 210 is scanned over the sample 201. FIG. 2 depicts this for the X-direction.

The periodically deflected electron beam 210 is focused into a spot on the sample by objective lens 212.

A frequency of the first oscillating electromagnetic field can for instance be set by properly designing the first microwave or RF wave supporting structure to have a resonance frequency at a desired frequency, so that a standing wave with the desired frequency can be created inside the first microwave or RF wave supporting structure, which standing wave causes the first oscillating electromagnetic field. An amplitude of the first oscillating electromagnetic field can be controlled by adjusting an input power of the first microwave or RF wave supporting structure. The amplitude may be set to correspond to a size of a to be scanned area on the sample, e.g., a desired field of view of the sample 203.

Electrons impacting the sample 203 may cause secondary electrons 213, which are emitted from sample 203 in a direction opposite as the electrons in the electron beam 210. A beam separator 214 such as a Wien filter may be provided in between the sample holder 202 and the first microwave or RF wave supporting structure 211 to deflect the secondary electrons towards the detection system 205 without affecting the electron beam 210.

In the example of FIG. 2, the detection system 205 includes a second microwave or RF wave supporting structure 215, a lens 216 and a detector 217. The second microwave or RF wave supporting structure 215 is preferably similar to the first microwave or RF wave supporting structure, e.g., by having the same resonance frequency, and preferably fed with the same microwave or RF wave input signal as the first microwave or RF wave supporting structure 211 to phase-lock the corresponding oscillating electromagnetic fields although an amplitude of the oscillating electromagnetic fields may be different. A lens system, e.g., the lens 216, then focuses the secondary electrons into a spot on the detector 217, so that the spot is scanned over the detector in a detection pattern similar to the scanning pattern of electron beam 210 as provided by the first microwave or RF wave supporting structure 211. In this way, the position on the detector 217 is directly correlated to a position on the sample 203.

Figure 3:
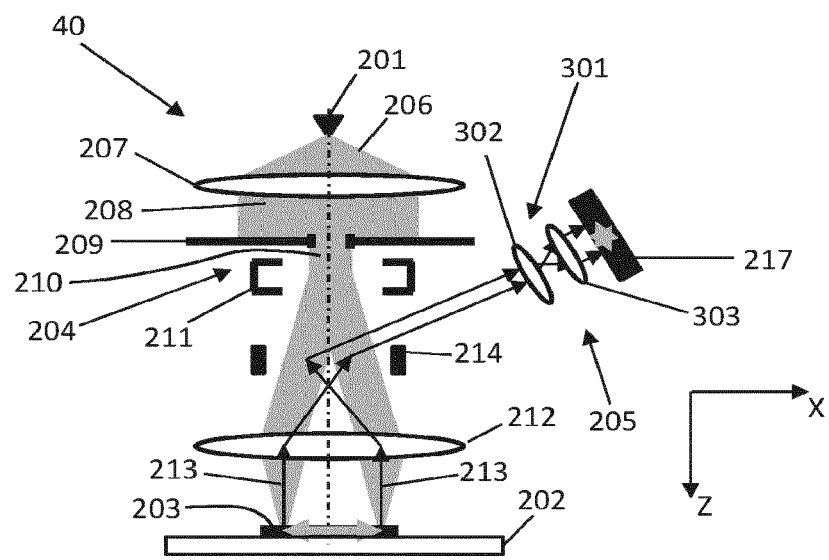
FIG. 3 schematically depicts another exemplary configuration of a scanning electron microscope that can be part of the exemplary electron beam inspection system of FIG. 1, consistent with embodiments of the present disclosure.

Reference is now made to FIG. 3, which illustrates another exemplary configuration of a scanning electron microscope 40 that can be part of the exemplary electron beam inspection system 100 of FIG. 1, consistent with embodiments of the present disclosure. The main difference between the configuration of FIG. 2 and the configuration of FIG. 3 is the detection system 205. In the configuration of FIG. 3, the second microwave or RF wave supporting structure is omitted and an imaging system 301 including one or more lenses, e.g., lenses 302 and 303, is provided to image the secondary electrons from the sample directly on the detector 217, so that the scanning pattern provided by the first microwave or RF wave supporting structure 211 is directly imaged on the detector 217.

Figure 4:
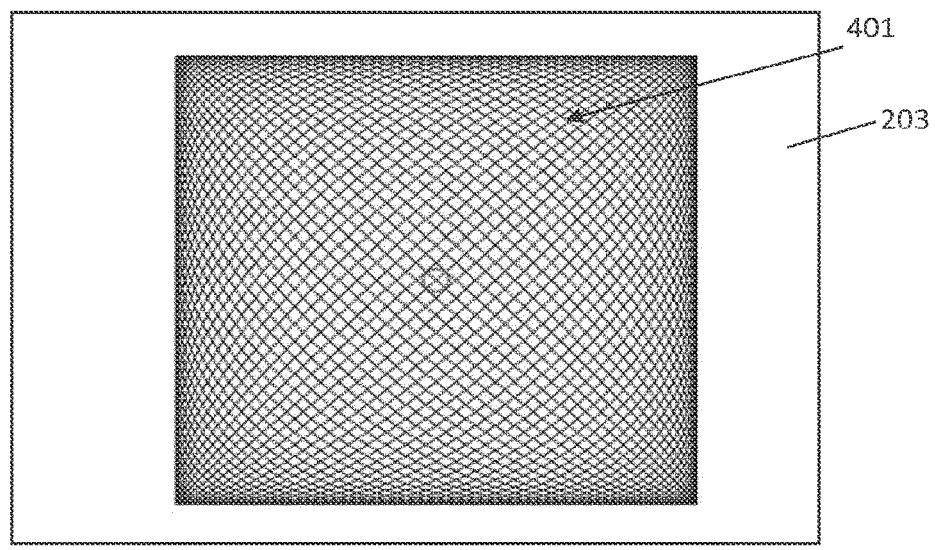
FIG. 4 schematically depicts an exemplary scanning pattern obtainable with for instance the exemplary scanning electron microscopes of FIGS. 2 and 3, consistent with embodiments of the present disclosure.

Although the above description only refers to a deflection in X-direction of the electron beam 210, the scanning system 204 may be configured to provide a second oscillating electromagnetic field different from the first oscillating electromagnetic field to periodically deflect the electron beam 210 in a direction other than the X-direction, namely, also at least partially in a Y-direction that is perpendicular to the depicted X- and Z-directions. To this end, the second oscillating electromagnetic field is preferably perpendicular to the first oscillating electromagnetic field. Further, the second oscillating electromagnetic field is preferably operated at a frequency other than the first oscillating electromagnetic field, so that in case the first and second oscillating electromagnetic fields are phase-locked, as is preferred, the scanning pattern forms a Lissajous pattern on the sample 203. An example of such a Lissajous pattern is depicted in FIG. 4, where a sample 203 is schematically depicted with a Lissajous FIG. 401 indicating the Lissajous scanning pattern. The area covered by the Lissajous FIG. 401 may span the entire sample 203, but may also cover only a portion of the sample 203 as in FIG. 4. Further, the Lissajous figure imaged on the detector 217 by wave supporting structure 215 in FIG. 2 may span the entire detector, or a portion of the detector, or span an area larger than the detector. In case of the latter, only the more linear portions of the Lissajous figure are detected and used for imaging.

A density of cross-overs in the Lissajous FIG. 401 is amongst others dependent on the used frequencies of the first and second oscillating electromagnetic fields. Suppose the first oscillating electromagnetic field is oscillating at a frequency f0 and the second oscillating electromagnetic field is oscillating at a frequency $f=f0*(1+1/N)$, then the number of crossovers in a direction corresponding to the first or second oscillating electromagnetic field is N.

Figures 5A, 5B:
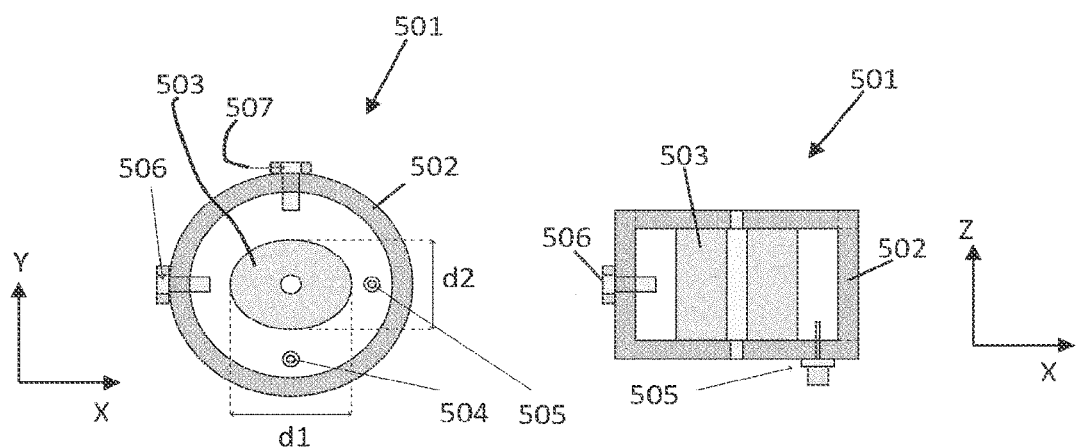
FIG. 5*a* schematically depicts a cross-sectional view of an exemplary microwave or RF wave supporting structure that can be part of the exemplary scanning electron microscopes of FIGS. 2 and 3, consistent with embodiments of the present disclosure.
FIG. 5*b* schematically depicts another cross-sectional view of the microwave or RF wave supporting structure of FIG. 5*a*.

Although additional microwave or RF wave supporting structures may be provided to provide the second oscillating electromagnetic field in the configurations of FIGS. 2 and 3, it is preferred to use a dual mode microwave or RF wave supporting structure as first microwave or RF wave supporting structure 211 and preferably also as second microwave or RF wave supporting structure 215, an example of which is depicted in FIGS. 5a and 5b.

FIGS. 5*a* and 5*b* depict a dual mode microwave or RF wave supporting structure 501 having a cylindrical housing 502. The cross-section of FIG. 5*a* is perpendicular to a propagation direction of an electron beam passing through the microwave or RF wave supporting structure 501, while FIG. 5*b* is parallel to said propagation direction. The microwave or RF wave supporting structure further includes a dielectric core 503 that is elliptical in the cross-section shown in FIG. 5*a*. Hence, dimension d1 is larger than dimension d2 resulting in a resonance frequency in Y-direction that is different from a resonance frequency in X-direction, perpendicular to the Y-direction. By providing a microwave or RF wave input signal to microwave or RF wave feedthroughs 504 and 505, preferably the same, more preferably phase-locked microwave or RF wave input signals, the first and second oscillating electromagnetic fields can be generated using a single microwave or RF wave supporting structure. The microwave or RF wave supporting structure 501 may further comprise tuning stubs 506, 507 to adjust the resonance frequency in the X- and Y-direction, respectively. An important advantage of using a dielectric core 503 is that it may reduce the necessary diameter of the wave supporting structure to a size that fits in a scanning electron microscope or that it may reduce the power consumption.

The above examples of inspection tools 40 as depicted in FIGS. 2 and 3 mainly differ in the type of detection system and may thus be used in different situations. The example of FIG. 3 may be used in situations in which the readout speed of the detector 217 is fast enough for the scanning speed provided by the scanning system 204 and the desired resolution. The scanning system 204 scans the electron beam 210 over the sample 203 thereby exciting secondary electrons at different subsequent sample positions at different time instances. The secondary electrons form a beam that is directed towards the detector 217 in which the spatial information about the sample is now contained in the temporal structure of said beam. When the detector 217 is fast enough to readout the information of each desired sample position, embodiments identical or similar to the example of FIG. 3 can be used. This detector 217 can then be or act as a single pixel detector as typically used in scanning electron microscopes.

When the detector 217 is not fast enough, which may be the result of a too high scanning speed and/or too high desired resolution and/or too low readout speed, the example of FIG. 2 may be used. The second microwave or RF wave supporting structure 215 is then used to convert the temporal structure of the beam of secondary electrons into spatial information again. By using a pixelated detector 217, a pixel on the detector 217 may then correspond to a particular sample position on the sample. The relation between pixel on the detector 217 and sample position on the sample may change in time. However, when the scanning pattern and the deflection pattern are synchronized, the relation between pixel on the detector 217 and sample position on the sample 203 may be fixed. As mentioned above, increasing the amplitude of the deflection pattern, i.e., increasing the amplitude of the electromagnetic field of the second microwave or RF wave supporting structure 215 allows to increase the spatial resolution as a larger detector 217 with more pixels can be used or allows to use larger pixels without affecting the spatial resolution or a combination thereof.

Figure 6:
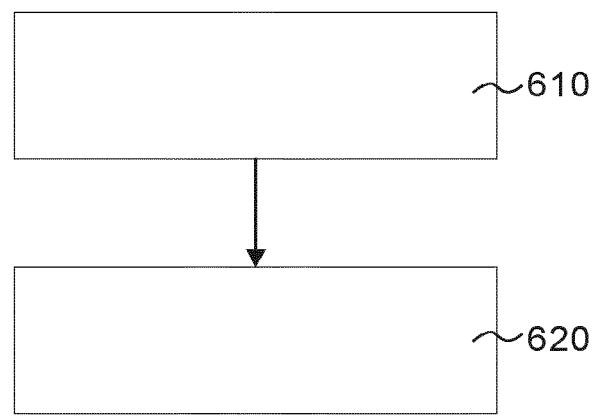
FIG. 6 schematically depicts a process flowchart representing an exemplary method of inspecting a sample using an inspection tool, consistent with embodiments of the present disclosure.

Reference is now made to FIG. 6, which illustrates a flowchart representing an exemplary method 600 of inspecting a sample using an inspection tool, consistent with embodiments of the present disclosure. Method 600 may be performed by controller 50 of EBI system 100, as shown in FIG. 1, for example. Controller 50 may be programmed to perform one or more blocks of method 600. Controller 50 may for instance include a non-transitory computer readable medium storing a set of instructions that is executable by one or more processors of an inspection tool, e.g., one or more processors of controller 50, to cause the inspection tool to perform one or more blocks of method 600. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

In step 610, a charged particle source (e.g., electron source 201 of FIGS. 2 and 3) may be activated to generate a charged particle beam of charged particles (e.g., electron beam 206 of FIGS. 2 and 3). The charged particle source may be activated by a controller (e.g., controller 50 of FIG. 1). For example, the charged particle source may be activated by a controller to emit primary electrons to form an electron beam along a primary optical axis. The charged particle source may be activated remotely, for example, using a software, an application, or a set of instructions for a processor of a controller to power the charged particle source through a control circuitry.

In step 620, a microwave or RF wave supporting structure (e.g., a microwave or RF wave supporting structure 211 of FIGS. 2 and 3) is operated to scan the charged particle beam passing through the microwave or RF wave supporting structure and towards a sample over an area of the sample in a scanning pattern. A resonance frequency of the microwave or RF wave supporting structure may be set to allow a scan rate of at least 1 GHz. Compared to a scan rate of 100 MHz, this results in a reduction of the charge deposited per scan to only 10% of a 100 MHz scan rate, resulting in an order of magnitude less charge and resulting in significantly reduced beam induced charging and shrinkage. Microwave or RF wave supporting structures can easily have resonance frequencies that are a multitude of 1 GHz, so that the charge deposited per scan can even be further reduced.

Figure 7:
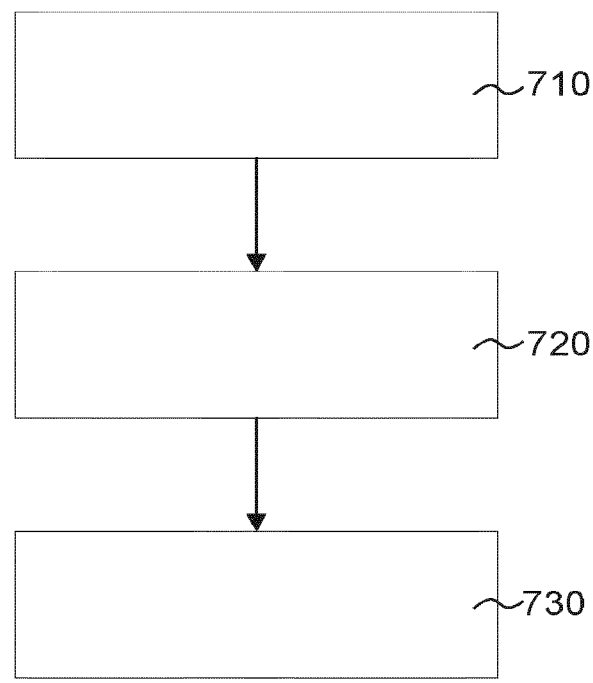
FIG. 7 schematically depicts a process flowchart representing another exemplary method of inspecting a sample using an inspection tool, consistent with embodiments of the present disclosure.

Reference is now made to FIG. 7, which illustrates a flowchart representing another exemplary method 700 of inspecting a sample using an inspection tool, consistent with embodiments of the present disclosure. Method 700 may be performed by controller 50 of EBI system 100, as shown in FIG. 1, for example. Controller 50 may be programmed to perform one or more blocks of method 600. Controller 50 may for instance include a non-transitory computer readable medium storing a set of instructions that is executable by one or more processors of an inspection tool, e.g., one or more processors of controller 50, to cause the inspection tool to perform one or more blocks of method 600. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

In step 710, a charged particle source (e.g., electron source 201 of FIGS. 2 and 3) may be activated to generate a charged particle beam of charged particles (e.g., electron beam 206 of FIGS. 2 and 3). The charged particle source may be activated by a controller (e.g., controller 50 of FIG. 1). For example, the charged particle source may be activated by a controller to emit primary electrons to form an electron beam along a primary optical axis. The charged particle source may be activated remotely, for example, using a software, an application, or a set of instructions for a processor of a controller to power the charged particle source through a control circuitry.

In step 720, a first microwave or RF wave deflection structure is operated to scan a sample with the charged particles passing the first microwave or RF wave deflection structure and towards the sample at a scan rate in excess of 1 GHz. Compared to a scan rate of 100 MHz, this results in a reduction of the charge deposited per scan to only 10% of a 100 MHz scan rate, resulting in an order of magnitude less charge and resulting in significantly reduced beam induced charging and shrinkage. Microwave or RF wave deflection structures can easily have resonance frequencies that are a multitude of 1 GHz, so that the charge deposited per scan can even be further reduced.

In step 730, a second microwave or RF wave deflection structure is operated in sync with the first microwave or RF wave deflection structure to cause secondary charged particles generated in response to charged particles being directed at the sample and impacting the sample to be deflected towards a detector. Operating in sync means that there is a fixed time-related relationship between the deflection caused by the first microwave or RF wave deflection structure and the deflection caused by the second microwave or RF wave deflection structure, e.g. because the deflection caused by the first microwave or RF wave deflection structure is in phase-lock with the deflection caused by the second microwave or RF wave deflection structure, or the scan rate of the second microwave or RF wave deflection structure is equal to the scan rate of the first microwave or RF wave deflection structure. The embodiments may further be described using the following clauses:

1. An inspection tool including:
   a charged particle source to provide a charged particle beam;
   a sample holder to hold a sample; and
   a scanning system configured to scan the charged particle beam over an area of the sample in a scanning pattern,
   wherein the scanning system comprises a microwave cavity to provide a first oscillating magnetic field to periodically deflect the charged particle beam in order to scan the charged particle beam over the area of the sample.
2. An inspection tool according to clause 1, wherein the charged particle beam is an electron beam.
3. An inspection tool according to clause 1, wherein the scanning system is configured to continuously scan the charged particle beam over the area of the sample.
4. An inspection tool according to clause 1, wherein the scanning system is configured to provide a second oscillating magnetic field different from the first oscillating magnetic field to periodically deflect the charged particle beam in order to scan the charged particle beam over the area of the sample.
5. An inspection tool according to clause 4, wherein said microwave cavity configured to provide the first oscillating magnetic field is also configured to provide the second oscillating field.
6. An inspection tool according to clause 4, wherein the microwave cavity is a first microwave cavity, and wherein the scanning system comprises a second microwave cavity configured to provide the second oscillating magnetic field.
7. An inspection tool according to clause 4, wherein the scanning system is configured to provide the first oscillating magnetic field perpendicular to the second oscillating magnetic field.
8. An inspection tool according to clause 4, wherein the scanning system is configured to operate the first oscillating magnetic field at a different frequency than the second oscillating magnetic field.
9. An inspection tool according to clause 4, wherein the scanning system is configured to operate the first oscillating magnetic field and the second oscillating magnetic field such that the first and second oscillating magnetic field are phase-locked.
10. An inspection tool according to clause 1, further comprising a detector system to detect back-scattered or secondary charged particles from the sample.
11. An inspection tool according to clause 10, wherein the detector system comprises an imaging system to image the back-scattered or secondary charged particles from the sample directly on a detector.
12. An inspection tool according to clause 10, wherein the detector system comprises a microwave cavity configured to provide an oscillating magnetic field similar to the first oscillating magnetic field to periodically deflect the charged particles from the sample to form an image on a detector.
13. An inspection tool according to clause 12, wherein the detector system comprises a lens system to focus the back-scattered or secondary charged particles from the sample before or after being deflected by the microwave cavity.
14. An inspection tool according to clause 10, wherein the detector system is configured to deflect the back-scattered or secondary charged particles from the sample in a deflection pattern similar to the scanning pattern to form an image on a detector.
15. An inspection tool according to clause 14, wherein the detector system and the scanning system are configured such that the deflection pattern of the detector system and the scanning pattern are phase-locked.
16. An inspection tool according to clause 14, wherein the detector system and the scanning system are configured such that the deflection pattern of the detector system and the scanning pattern have a phase difference of 90 degrees.
17. An inspection tool according to clause 1, further comprising an objective lens arranged between the scanning system and the sample holder, wherein the scanning system includes a counteracting microwave cavity configured to deflect the charged particle beam from the microwave cavity providing the first oscillating magnetic field towards an optical axis or origin of the objective lens.
18. An inspection tool according to clause 10, further comprising a beam separator to direct the charged particles from the sample towards the detector system.
19. An inspection tool according to clause 18, wherein the beam separator is a Wien filter.
20. An inspection tool according to clause 18, wherein the beam separator is arranged between the sample holder and the scanning system.

21. An inspection tool according to clause 18, wherein said microwave cavity is arranged between the sample holder and the beam separator.
22. An inspection tool according to clause 21, wherein another microwave cavity is arranged between the beam separator and the detector system to counteract the periodic deflection imposed on the back-scattered or secondary charged particles from the sample by the microwave cavity arranged between the sample holder and the beam separator.
23. An inspection tool according to clause 1, wherein the scanning system is configured to provide one or more oscillating magnetic fields that are higher-order harmonics of the first oscillating magnetic field to be combined with the first oscillating magnetic field to approximate a triangular-shaped oscillating magnetic field.
24. A method of scanning a sample in an inspection tool, the method comprising:
   a. generating a charged particle beam;
   b. passing the charged particle beam through a microwave cavity and towards a sample to scan the charged particle beam over an area of the sample in a scanning pattern
25. A method according to clause 24, wherein the charged particle beam is continuously scanned over an area of the sample in a scanning pattern.
26. A method according to clause 24, wherein the charged particle beam is an electron beam.
27. A method according to clause 24, wherein the scanning pattern is a 2D pattern.
28. A method according to clause 27, wherein the scanning pattern is a Lissajous pattern.
29. A method according to clause 24, further comprising the step of capturing back-scattered or secondary charged particles from the sample and imaging said charged particles on a detector.
30. A method according to clause 29, wherein a further microwave cavity is provided to deflect said back-scattered or secondary charged particles from the sample to form an image on the detector in accordance with a deflection pattern.
31. A method according to clause 25, wherein the deflection pattern is similar to the scanning pattern.
32. A non-transitory computer readable medium storing a set of instructions that is executable by one or more processors of an inspection tool to cause the inspection tool to perform a method of inspecting a sample, the method comprising:
   a. activating a charged particle source to generate a charged particle beam;
   b. operating a microwave cavity to scan the charged particle beam passing through the microwave cavity and towards a sample over an area of the sample in a scanning pattern.
33. A non-transitory computer readable medium according to clause 32, wherein the scanning pattern is a 2D pattern.
34. A non-transitory computer readable medium according to clause 33, wherein the scanning pattern is a Lissajous pattern.
35. A non-transitory computer readable medium according to clause 32, wherein the set of instructions that is executable by one or more processors of an inspection tool cause the inspection tool to further perform deflecting back-scattered or secondary charged particles from the sample to form an image on the detector in accordance with a deflection pattern.
36. A non-transitory computer readable medium according to clause 35, wherein the deflection pattern is similar to the scanning pattern.
37. An inspection tool comprising:
   a charged particle source to generate charged particles;
   a first microwave deflection cavity to direct charged particles from the charge particle source towards a sample,
wherein the first microwave deflection cavity is configured to scan the sample at a scan rate in excess of 1 GHz.
38. An inspection tool according to clause 37, wherein the charged particle source is an electron source.
39. An inspection tool according to clause 37, further comprising a second microwave deflection cavity to direct secondary charged particles generated in response to the charged particles directed at the sample impacting the sample towards a detector.
40. An inspection tool according to clause 37, wherein the first and second microwave deflection cavity are configured to be operated in sync.
41. A method of scanning a sample in an inspection tool, the method comprising:
   a. generating charged particles via a charged particle source; and
   b. passing the charged particles through a first microwave deflection cavity and towards a sample to enable the sample to be scanned at a scan rate in excess of 1 GHz.
42. A method according to clause 41, wherein the charged particle source is an electron source.
43. A method according to clause 41, further comprising in response to the charged particles directed at the sample impacting the sample and causing secondary charged particles to be generated, passing the secondary charged particles through a second microwave deflection cavity that is synchronized with the first microwave deflection cavity to cause the secondary charged particles to be deflected towards a detector.
44. A method according to clause 41, further comprising scanning the sample in a Lissajous pattern at a scan rate in excess of 1 GHz.
45. A method according to clauses 44, wherein the Lissajous pattern is imaged directly on the detector.
46. A method according to clause 43, wherein the first and second microwave deflection cavity are synchronized with a non-zero phase difference.
47. A non-transitory computer readable medium storing a set of instructions that is executable by one or more processors of an inspection tool to cause the inspection tool to perform a method of inspecting a sample, the method comprising:
   a. activating a charged particle source to generate charged particles;
   b. operating a first microwave deflection cavity to scan a sample with the charged particles passing the first microwave deflection cavity and towards the sample at a scan rate in excess of 1 GHz.
48. A non-transitory computer readable medium according to clause 47, wherein the set of instructions that is executable by one or more processors of an inspection tool cause the inspection tool to further perform operating a second microwave deflection cavity in sync with the first microwave deflection cavity to cause secondary charged particles generated in response to charged particles being directed at the sample and impacting the sample to be deflected towards a detector.
49. A non-transitory computer readable medium according to clause 47, wherein operating the first microwave deflection cavity causes the sample to be scanned in a Lissajous pattern at a scan rate in excess of 1 GHz.

Although in some of the above aspects and embodiments of the present disclosure a scan rate in excess of 1 GHz is mentioned, it is clear to the skilled person that this is not an essential feature unless specifically mentioned otherwise and that other aspects and embodiments may use a scan rate below 1 GHz, e.g. for instance a scan rate in excess of 10 MHz, preferably in excess of 25 MHz, more preferably in excess of 40 MHz, and most preferably in excess of 100 MHz.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments will be apparent to those skilled in the art from consideration of the specification and practice of the technology disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. An inspection tool including:
   a charged particle source to provide a charged particle beam;
   a sample holder to hold a sample; and
   a scanning system configured to scan the charged particle beam over an area of the sample in a scanning pattern, wherein the scanning system comprises a microwave or RF wave supporting structure to provide a first oscillating electromagnetic field to periodically deflect the charged particle beam in order to continuously scan the charged particle beam over the area of the sample for enabling an improvement of a scan rate of the inspection tool in excess of 1 GHz.

2. An inspection tool according to claim 1, wherein the charged particle beam is an electron beam.

3. An inspection tool according to claim 1, wherein the scanning system is configured to provide a second oscillating electromagnetic field different from the first oscillating electromagnetic field to periodically deflect the charged particle beam in order to scan the charged particle beam over the area of the sample.

4. An inspection tool according to claim 3, wherein said microwave or RF wave supporting structure configured to provide the first oscillating electromagnetic field is also configured to provide the second oscillating field.

5. An inspection tool according to claim 3, wherein the microwave or RF wave supporting structure is a first microwave or RF wave supporting structure, and wherein the scanning system comprises a second microwave or RF wave supporting structure configured to provide the second oscillating electromagnetic field.

6. An inspection tool according to claim 3, wherein the scanning system is configured to provide the first oscillating electromagnetic field perpendicular to the second oscillating electromagnetic field.

7. An inspection tool according to claim 3, wherein the scanning system is configured to operate the first oscillating electromagnetic field at a different frequency than the second oscillating electromagnetic field.

8. An inspection tool according to claim 3, wherein the scanning system is configured to operate the first oscillating electromagnetic field and the second oscillating electromagnetic field such that the first and second oscillating electromagnetic field as phase-locked.

9. An inspection tool according to claim 1, further comprising a detector system to detect back-scattered or secondary charged particles from the sample.

10. An inspection tool according to claim 9, wherein the detector system comprises an imaging system to image the back-scattered or secondary charged particles from the sample directly on a detector.

11. An inspection tool according to claim 9, wherein the detector system comprises a microwave or RF wave supporting structure configured to provide an oscillating electromagnetic field similar to the first oscillating electromagnetic field to periodically deflect the back-scattered or secondary charged particles from the sample to form a deflection pattern on a detector.

12. An inspection tool according to claim 11, wherein the detector system comprises a lens system to focus the back-scattered or secondary charged particles from the sample before or after being deflected by the microwave or RF wave supporting structure.

13. An inspection tool according to claim 9, wherein the detector system is configured to deflect the back-scattered or secondary charged particles from the sample in a deflection pattern similar to the scanning pattern to form the deflection pattern on a detector.

14. A method of scanning a sample in an inspection tool, the method comprising:
   generating a charged particle beam;
   passing the charged particle beam through a microwave or RF wave supporting structure to periodically deflect the charged particle beam towards a sample to scan the charged particle beam over an area of the sample in a continuous scanning pattern for enabling an improvement of a scan rate of the inspection tool in excess of 1 GHz.

15. A non-transitory computer readable medium storing a set of instructions that is executable by one or more processors of an inspection tool to cause the inspection tool to perform a method of inspecting a sample, the method comprising:
   activating a charged particle source to generate a charged particle beam;
   operating a microwave cavity to scan the charged particle beam passing through the microwave cavity and periodically deflect the charted particle beam towards a sample over an area of the sample in a continuous scanning pattern for enabling an improvement of a scan rate of the inspection tool in excess of 1 GHz.

16. A non-transitory computer readable medium according to claim 15, wherein the scanning pattern is a 2D pattern.

17. A non-transitory computer readable medium according to claim 16, wherein the scanning pattern is a Lissajous pattern.

18. A non-transitory computer readable medium according to claim 15, wherein the set of instructions that is executable by one or more processors of an inspection tool cause the inspection tool to further perform deflecting back-scattered or secondary charged particles from the sample to form an image on a detector in accordance with a deflection pattern.

19. A non-transitory computer readable medium according to claim 18, wherein the deflection pattern is similar to the scanning pattern.

* * * * *